Oct. 29, 1968    C. D. DICKINSON ET AL    3,407,231
METHOD OF MAKING FLEXIBLE ELECTRODES
Filed Dec. 21, 1964

INVENTORS
CLAYTON D. DICKINSON
JEROME J. PEREZ
IRVING SHEINHARTZ

BY

*R. J. Frank*
ATTORNEY

United States Patent Office

3,407,231
Patented Oct. 22, 1968

3,407,231
DIMETHYLACETAMIDE PRODUCTION
Kenzie Nozaki, El Cerrito, Calif., assignor to Shell Oil Company, New York, N.Y., a corporation of Delaware
No Drawing. Filed May 25, 1966, Ser. No. 552,729
3 Claims. (Cl. 260—561)

ABSTRACT OF THE DISCLOSURE

Dimethylacetamide is produced as an essentially exclusive product by contacting trimethylamine and carbon monoxide in the presence of dicobalt octacarbonyl as catalyst.

---

Figure 1:
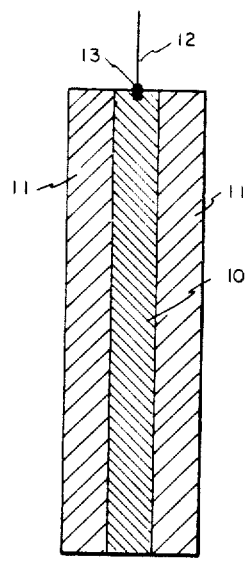
Figure 2:
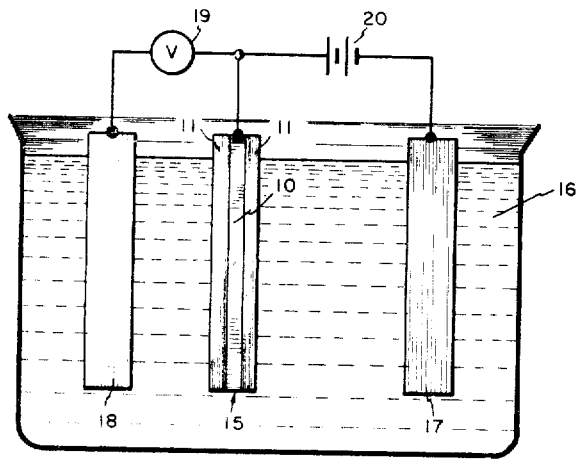

This invention relates to an improved method of producing N,N-dimethylacetamide.

PRIOR ART

Reference is made in the art to processes of contacting trimethylamine with carbon monoxide in the presence of metal catalysts. The German Patent No. 863,800 issued Jan. 19, 1953, to Krzikalla et al. discloses the contacting of trimethylamine with carbon monoxide in the presence of a supported catalyst comprising mixed oxides of magnesium, thorium and cobalt to produce dimethylformamide. The German Patent No. 948,056 issued Aug. 30, 1956, to Friederich et al. discloses a similar contacting in the presence of added hydrogen and a catalyst comprising cobalt bromide and a complex of the formula $$[(CH_3)_4N]_2CoBr_2I_2$$

to produce a mixture of N-methyldiacetimide and N,N-dimethylacetamide.

OBJECTS

It is an object of the present invention to provide an improved method for the production of N,N-dimethylacetamide, hereinafter termed dimethylacetamide. More particularly, it is an object to provide an improved method of carbonylating trimethylamine to produce dimethylacetamide.

THE INVENTION

It has now been found that these objects are accomplished by contacting trimethylamine and carbon monoxide at elevated temperature and pressure in the presence of dicobalt octacarbonyl as catalyst. The process of the invention results in the formation of dimethylacetamide in a selectivity which typically approaches quantitative.

PROCESS CONDITIONS

The process of the invention comprises intimately contacting the trimethylamine and carbon monoxide reactants in the presence of a catalyst. No special precautions are required with regard to the reaction mixture components and commercially available grades of these materials of reasonable purity are satisfactory. The method of reactant contacting is not material and in one modification the process is conducted in a continuous manner as by contacting the reactants and catalyst during passage through a tubular reactor. In a second modification, the reaction is conducted in a batchwise manner in an autoclave or similar pressure reactor. In such a modification one reactant may be added to the other in increments although it is equivalently useful to initially charge the entire amounts of reactants and catalyst to the reactor as by charging the trimethylamine and catalyst and pressurizing the reactor with carbon monoxide prior to raising the reaction mixture temperature to the desired level. The reaction temperature is not critical and temperatures from about 175° C. to about 275° C. are satisfactory with the temperature range from about 200° C. to about 250° C. being preferred. The precise reaction pressure will depend in part upon the reaction temperature employed. In a typical procedure the reactor is pressurized with carbon monoxide at ambient temperature and the reaction mixture is heated to the desired reaction temperature. The initial carbon monoxide pressure inside the reactor will increase accordingly. Within the suitable temperature range, carbon monoxide pressures from about 1000 p.s.i.g. to about 6000 ps.i.g. are satisfactory with best results being obtained when a carbon monoxide pressure from about 1500 p.s.i.g. to about 2500 p.s.i.g. at reaction temperature is utilized.

The presence in the reaction mixture of an inert diluent appears to provide no detrimental effect and, if desired, inert normally-liquid diluents such as hydrocarbons free from aliphatic unsaturation, e.g., hexane, heptane, cyclohexane, decane, benzene, toluene, tetrahydronaphthalene and the like, or inert normally-gaseous diluents such as nitrogen, argon or helium may be utilized. However, no apparent advantages arise through the use of a reaction diluent and in the preferred modification the reaction mixture consists essentially of the trimethylamine and carbon monoxide reactants and the dicobalt octacarbonyl catalyst. It is required that the reaction be conducted in an essentially inert atmosphere and the presence of substantial quantities of reactive materials such as oxygen, hydrogen, water and the like is preferably avoided.

CATALYST

The dicobalt octacarbonyl is employed in catalytic amounts, i.e., molar amounts that are equal to or less than the amount of trimethylamine. Molar ratios of dicobalt octacarbonyl to trimethylamine from about 1:100 to about 1:1 are satisfactory. Preferred, however, are molar ratios of dicobalt octacarbonyl to trimethylamine from about 1:25 to about 1:2. In some applications it may be preferable to employ dicobalt octacarbonyl on an inert, neutral support, e.g., silica, alumina or the like, but in the preferred modification the dicobalt octacarbonyl is employed as an unsupported catalyst.

Subsequent to reaction, the product mixture is separated and the dimethylacetamide recovered by conventional means, e.g., fractional distillation, selective extraction and the like. Any unreacted trimethylamine is suitable recycled to the catalyst which is reusable without regeneration.

The product of the invention, dimethylacetamide, is a chemical of commerce useful, for example, as a solvent for polymeric materials such as polyacrylonitrile fibers.

To further illustrate the improved process of the invention, the following examples are provided. It should be understood that the details thereof are not to be regarded as limitations as they may be varied as will be understood by one skilled in this art.

Example I

To a 50 ml. reactor was charged 0.5 g. of dicobalt octacarbonyl in an atmosphere of nitrogen. The reactor was cooled to −80° C., evacuated, and 2 g. of trimethylamine was then added. The reactor was warmed to room temperature, charged with 1200 p.s.i.g. of carbon monoxide and the vessel and contents were heated and maintained at 225° C. for 16 hours. At reaction temperature, the initial carbon monoxide pressure was approximately 2000 p.s.i.g. At the conclusion of the reaction period the heated reactor was vented into a cold trap maintained at −80° C. and the remaining products were evacuated from the reactor into the trap by means of a high vacuum. Unreacted trimethylamine was removed from the condensate by warming the product mixture to about 100° C. to afford 2.90 g. of product, of which about 0.1 g. was unreacted trimethylamine and the remainder was dimethylacetamide in a purity of greater than 99%.

Example II

The procedure of Example I was repeated except that after the reaction period of 16 hours at 225° C., the reactor was cooled to room temperature and vented. An additional 2 g. of trimethylamine was added, the reactor was pressurized with carbon monoxide to 1200 p.s.i.g., and the reaction mixture was maintained at 225° C. for 16 hours. Product recovery as described in Example I afforded 5.8 g. of essentially pure dimethylacetamide.

I claim as my invention:

1. The process of producing dimethylacetamide as the essentially exclusive reaction product by contacting trimethylamine and carbon monoxide in an inert atmosphere at a temperature from about 175° C. to about 275° C. and a carbon monoxide pressure from about 1000 p.s.i.g. to about 6000 p.s.i.g. in the presence of 0.01 mole to about 1 mole of dicobalt octacarbonyl per mole of trimethylamine as catalyst.

2. The process of claim 1 wherein the temperature of said contacting is from about 200° C. to about 250° C.

3. The process of claim 2 wherein the pressure is from about 1500 p.s.i.g. to about 2500 p.s.i.g.

References Cited

FOREIGN PATENTS 948,056   8/1956   Germany.

OTHER REFERENCES

Bird: Chemical Reviews (1962), pp. 294–99.

NICHOLAS S. RIZZO, *Primary Examiner.*

J. A. NARCAVAGE, *Assistant Examiner.*